US009368239B2

(12) United States Patent
Nagae

(10) Patent No.: US 9,368,239 B2
(45) Date of Patent: Jun. 14, 2016

(54) EX-CORE NUCLEAR INSTRUMENTATION SYSTEM

(75) Inventor: Tomoyoshi Nagae, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 560 days.

(21) Appl. No.: 13/585,184

(22) Filed: Aug. 14, 2012

(65) Prior Publication Data
US 2013/0243146 A1 Sep. 19, 2013

(30) Foreign Application Priority Data

Mar. 13, 2012 (JP) ................. 2012-055289

(51) Int. Cl.
G21C 17/108 (2006.01)
G21D 3/00 (2006.01)
(52) U.S. Cl.
CPC .............. G21C 17/108 (2013.01); G21D 3/001 (2013.01); Y02E 30/40 (2013.01)
(58) Field of Classification Search
USPC .......................................... 376/259
See application file for complete search history.

(56) References Cited

U.S. PATENT DOCUMENTS 3,998,694 A * 12/1976 Luger ............................ 376/217
4,774,049 A * 9/1988 Impink et al. ................. 376/245
7,152,002 B2 * 12/2006 Lingren et al. .................. 702/23
7,822,958 B1 * 10/2010 Allen et al. ........................ 713/1
2003/0002612 A1 * 1/2003 Menard .......................... 376/215
2005/0281368 A1 12/2005 Droba et al.
2005/0283338 A1 12/2005 Frederick et al.
2005/0283553 A1 12/2005 Droba
2011/0274230 A1 * 11/2011 Oriol et al. ..................... 376/255

FOREIGN PATENT DOCUMENTS

| JP | A-1-178898 | 7/1989 |
| JP | A-2-231597 | 9/1990 |
| JP | 5-241816 A | 9/1993 |
| JP | 2000-266884 A | 9/2000 |
| JP | A-2006-4436 | 1/2006 |
| JP | 2008-305447 A | 12/2008 |

OTHER PUBLICATIONS

Mar. 24, 2015 Japanese Office Action issued in Japanese Application No. 2012-055289 (with English language translation).

* cited by examiner

Primary Examiner — Sean P Burke
(74) Attorney, Agent, or Firm — Buchanan Ingersoll & Rooney PC

(57) ABSTRACT

The ex-core nuclear instrumentation system includes a key hole, and it is configured such that in the state where a key lock switch is inserted into the key hole, writing to a electrically rewritable nonvolatile memory is made valid by a general-purpose logic, and when writing to a electrically rewritable nonvolatile memory is in valid and the operation panel and the FPGA perform a serial communication and in a case where the data order of the serial communication is the predetermined data order, the CPU controls the electrically rewritable nonvolatile memory, and rewriting data, which is outputted from the operation panel, to the electrically rewritable nonvolatile memory is transmitted from the FPGA to the electrically rewritable nonvolatile memory so as to rewrite the data in the electrically rewritable nonvolatile memory.

5 Claims, 4 Drawing Sheets

EX-CORE NUCLEAR INSTRUMENTATION SYSTEM

BACKGROUND OF THE INVENTION

1. Field of the Invention

The present invention relates to an ex-core nuclear instrumentation system that monitors neutron flux outside a reactor vessel and, more particularly, relates to an ex-core nuclear instrumentation panel that constitutes the ex-core nuclear instrumentation system.

2. Description of the Related Art

An ex-core nuclear instrumentation system continuously monitors a neutron flux outside a reactor vessel of a pressurized water reactor (PWR) and accordingly the state of the reactor at start and in operation is monitored; and when an abnormality is detected in the condition of the neutron flux, the ex-core nuclear instrumentation system outputs an alarm signal and a signal for emergency shutdown of the reactor and accordingly the reactor is protected. The ex-core nuclear instrumentation system mainly includes a neutron detector that measures the neutron flux and converts the neutron flux into a current value and an ex-core nuclear instrumentation panel that performs arithmetic processing of the converted current value to convert into the signals.

Generally, a neutron measurement range of the ex-core nuclear instrumentation system is divided into a neutron source range, an intermediate range, and an output range (operation range) depending on the level of neutron flux from a stopped state to output operation of the reactor. The structure and function of the neutron detector and the ex-core nuclear instrumentation panel is different for each range, and a detector signal processing circuit (I/E amplifier, that is, current/voltage amplifier) is used for performing arithmetic processing of the output range.

An ex-core nuclear instrumentation system includes a neutron detector and an ex-core nuclear instrumentation panel as above-mentioned. A plurality of the neutron detector is located around outside a reactor vessel to be provided inside a reactor containment vessel. The neutron detector measures neutron flux leaked from the reactor vessel and converts the neutron flux into a current value. The current value is inputted to a detector signal processing circuit of the ex-core nuclear instrumentation panel and is converted into an output voltage corresponding to a reactor power level. Then, the output voltage of the detector signal processing circuit is inputted to a signal processing card. The signal processing card performs analog/digital (A/D) conversion and engineering value conversion, and outputs various signals to an operation panel and an input and output card in a reactor protection based system. Further, the measured data which is converted into digital data is stored in an electrically rewritable storage device such as EEPROM (Electronically Erasable and Programmable Read Only Memory) (registered trademark).

Here, in order to correct the aged deterioration of a neutron detector itself, an amplifier of a detector signal processing circuit, etc., calibration work is required (For example, Japanese Unexamined Patent Publication No. 2000-266884). The calibration work is performed via an operation panel by an operator. In performing the calibration work, in some cases, work of rewriting the data stored in the storage device is generated.

Regarding conventional ex-core nuclear instrumentation systems, FIG. 4 is a block diagram showing an example of a memory access structure for rewriting the data which is stored in a storage device. The memory access structure includes a signal processing card 111, on which a CPU 220, a FPGA (Field Programmable Gate Array) 230 and an electrically rewritable nonvolatile memory 240 such as an EEPROM (registered trademark) are equipped, and an operation panel 120 which is operated by a human being from outside. The operation panel 120 is provided at an electronic substrate 310 which is separated from the signal processing card 111.

The CPU 220 mainly performs control of signal processing or performs arithmetic processing. The data is inputted from the operation panel 120 by communicating with the FPGA 230. When the data is inputted, a write signal which is transmitted from the CPU is processed by a software with FPGA 230, and the FPGA 230 directly rewrites the data which is stored in the nonvolatile memory 240.

SUMMARY OF THE INVENTION

Memory access of rewriting data in conventional ex-core nuclear instrumentation systems are configured as above-mentioned. It is configured such that when the data is rewritten by inputting the data from an operation panel, the operation is performed via software processing with FPGA, therefore the operation is not performed by directly accessing to memory from CPU. In a case of memory access via FPGA, there is a problem such that the processing inside the FPGA is a black box, therefore operation can not be understood only by a circuit diagram.

Further, there also other problems such that a nonvolatile memory does not have a reset function, therefore, at the start of power supply, etc, false writing into the memory might be generated, or in a case where erroneous operation of operation panel is performed, the data in the memory might be rewritten.

In order to solve the above-mentioned problems, this invention was made. An objective of this invention is to provide an ex-core nuclear instrumentation system in which false writing into a memory can be prevented under various kinds of situation so as to secure more safety.

An ex-core nuclear instrumentation system according to this invention includes neutron detectors which measure neutron flux leaked from a reactor vessel and convert the neutron flux into a current value, a detector signal processing circuit which converts the converted current value into a voltage value, a signal processing card which performs arithmetic processing using a voltage value which is converted in the detector signal processing circuit so as to input the state of neutron flux during the operation of the reactor, and an operation panel having a man machine interface, wherein the signal processing card includes a CPU, a FPGA, an electrically rewritable nonvolatile memory and a key hole, it is configured such that in the state where a key lock switch is inserted into the key hole, by a general-purpose logic, writing to the electrically rewritable nonvolatile memory is made valid, and when writing to the electrically rewritable nonvolatile memory is in valid and the operation panel and the FPGA perform a serial communication and in a case where the data order of the serial communication is the predetermined data order, the CPU controls the electrically rewritable nonvolatile memory, and rewrite data, which is outputted from the operation panel, to the electrically rewritable nonvolatile memory is transmitted from the FPGA to the electrically rewritable nonvolatile memory so as to rewrite the data in the electrically rewritable nonvolatile memory.

According to this invention, a reliable ex-core nuclear instrumentation system in which false writing to a memory can be prevented under various kinds of situations can be provided.

DETAILED DESCRIPTION OF THE PREFERRRED EMBODIMENTS

Embodiment 1

Figure 2:
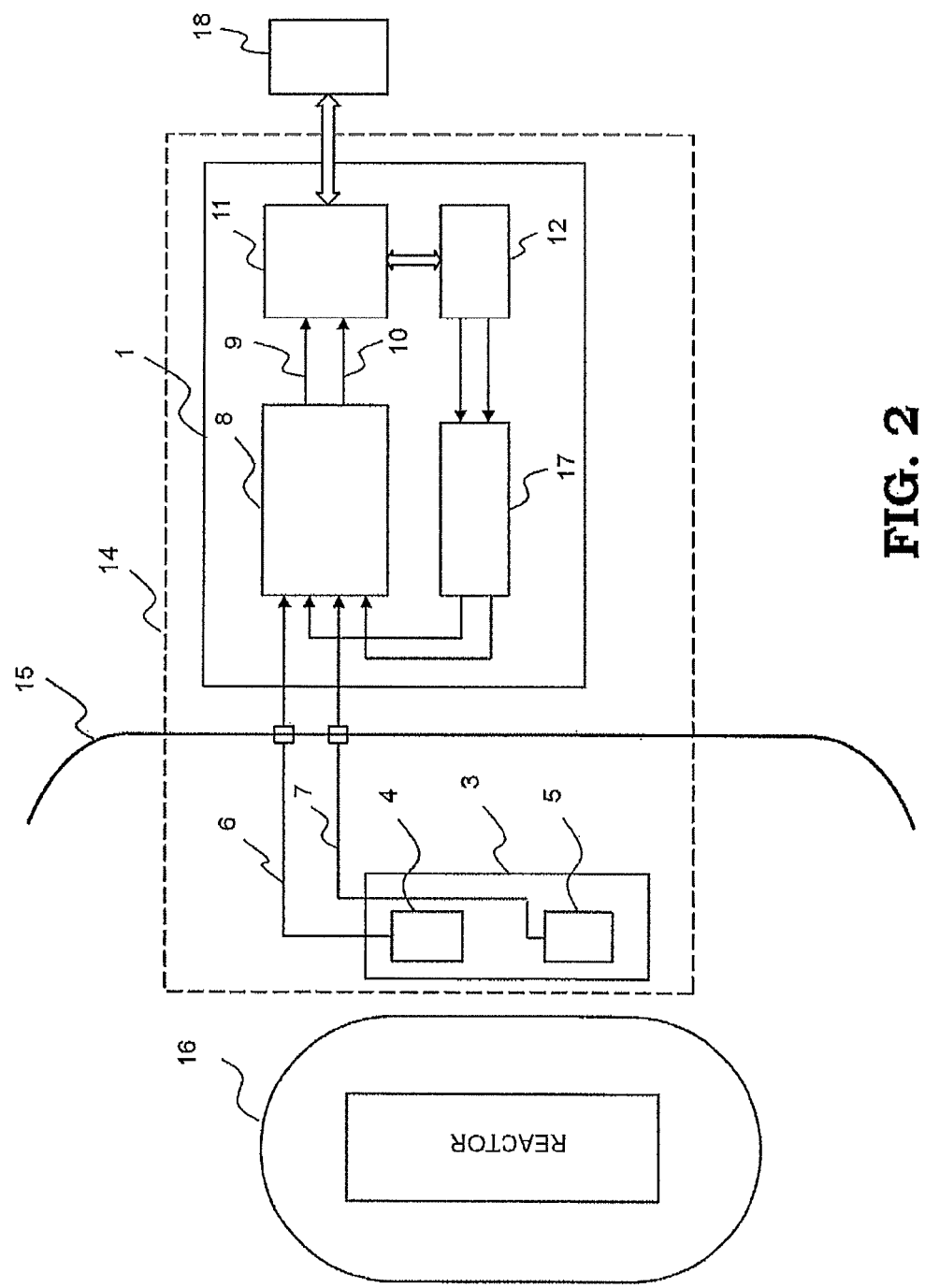
FIG. 2 is a diagram showing a general configuration of an ex-core nuclear instrumentation system.

FIG. 2 is a configuration diagram showing a general configuration of an ex-core nuclear instrumentation system. In FIG. 2, a neutron detector 3 of an ex-core nuclear instrumentation system 14 is provided around outside a reactor vessel 16 which is located in a reactor containment vessel 15. The neutron detector 3 is one in which an upper detector 4 and a lower detector 5 are integrated. The upper detector 4 detects neutron flux leaked from an upper part of the reactor vessel 16 and converts the neutron flux into a current value; and the lower detector 5 detects a neutron flux leaked from a lower part of the reactor vessel 16 and converts the neutron flux into a current value. The current value converted by the upper detector 4 is inputted to a detector signal processing circuit 8 located in an ex-core nuclear instrumentation panel 1 of the ex-core nuclear instrumentation system 14 via an upper detector cable 6, the ex-core nuclear instrumentation panel 1 being usually located outside the reactor containment vessel 15. The current value converted by the lower detector 5 is also similarly inputted to the detector signal processing circuit 8 via a lower detector cable 7.

The detector signal processing circuit 8 has a circuit corresponding to the upper detector 4 and a circuit corresponding to the lower detector 5, respectively; and, by the detector signal processing circuit 8, the current values are converted into an output voltage signal for the upper detector 9 and an output voltage signal for the lower detector 10. Both of the output voltage signals 9 and 10 are inputted to a signal processing card 11 in the ex-core nuclear instrumentation panel 1. The signal processing card 11 performs analog/digital (A/D) conversion and engineering value conversion, and data communication of various kinds of signals is performed by serial communication with an operation panel 12 which is provided at an electronic substrate 31 which separates from the signal processing card 11 or with a reactor protection board 18.

Figure 1:
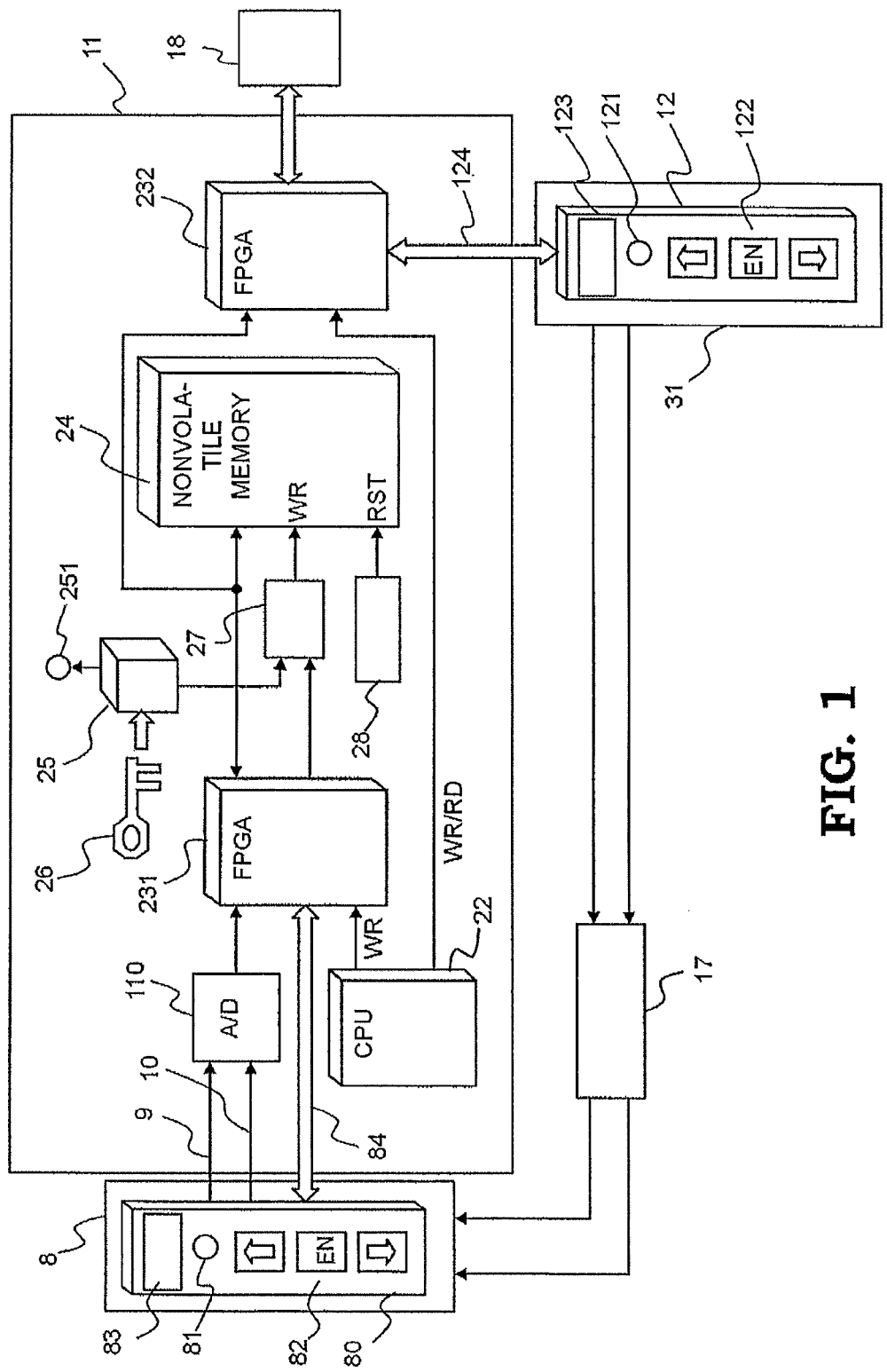
FIG. 1 is a block diagram showing an outline of a signal processing card of an ex-core nuclear instrumentation system according to Embodiment 1.

The details of the signal processing card 11 according to embodiment of this invention are shown in FIG. 1. The output voltage signal for the upper detector 9 and the output voltage signal for the lower detector 10 which are transmitted from the detector signal processing circuit 8 are inputted to an A/D converter 110 so as to be converted into a digital signal, and then is inputted to a first FPGA (Field Programmable Gate Array) 231. Further, the detector signal processing circuit 8 has a man machine interface such as an indicator 83, an input key 82, etc. in a front operation panel 80. From the front operation panel 80, for example, the gain of an amplifier in the detector signal processing circuit 8 can be set. The gain value is inputted also to the first FPGA 231 via a serial communication line 84. The indicator 83 indicates the gain when the gain is set or indicates an engineering value or a trip set value.

On the other hand, an operation panel 12 also has a man machine interface such as an indicator 123, an input key 122, etc. From the operation panel, a trip set value is changed or a gain is set. Further, from the operation panel 12, for periodical adjustment, or calibration work, a test signal is transmitted to the detector signal processing circuit 8 via a card for test calibration 17 so as to perform adjustment and calibration work. Further, from the front operation panel 80 in the detector signal processing circuit 8, as above-mentioned, a gain of an amplifier in the detector signal processing circuit 8, etc. is set. On the other hand, from the operation panel 12, when the sensitivity of the neutron detector 3 itself such as the upper detector 4 or the lower detector 5 is changed due to its aged deterioration, a correction coefficient as the amount of variation is set. From the operation panel 12, in a case where abnormalities exceeding a predetermined level or fault are generated, a trip set value is set so as to change a neutron flux high trip (high set) value for making an emergency stop. The operation panel 12 performs serial communication with a second FPGA 232 via a serial communication line 124 so as to write again value, which is set by the operation panel 12, in an electrically rewritable nonvolatile memory 24 from the second FPGA 232.

As above-mentioned, in the electrically rewritable nonvolatile memory 24, in addition to set value data which is transmitted from the detector signal processing circuit 8, set value data which is transmitted from the operation panel 12, an invariable value such as device numbers which are determined by signal processing card unit or a device numbers of a reactor protection board 18 which is a communication connecting party is stored.

Here, memory access structure will be described. Data to the electrically rewritable nonvolatile memory 24 is transmitted from the first FPGA 231 and the second FPGA 232. Memory access control is performed by a CPU 22. However, in a case where writing data to the electrically rewritable nonvolatile memory 24 is always capable, there is the risk such that false writing is made. Therefore, in the signal processing card 11, a key hole 25 for physically limiting memory access is provided. The key hole 25 outputs a signal for limiting the access to the electrically rewritable nonvolatile memory 24 via a general-purpose logic 27. When the key hole 25 is not opened, a write signal which is transmitted from the CPU 22 via the first FPGA 231 is made invalid by the general-purpose logic 27, therefore an access of the electrically rewritable nonvolatile memory 24 is limited by the general-purpose logic 27. When the key hole 25 is opened by a key lock switch 26, a write signal which is transmitted from the CPU 22 via the first FPGA 231 is made valid by the general-purpose logic 27. Consequently, data which is stored in the electrically rewritable nonvolatile memory 24 can be rewritten.

Further, in a case where the keyhole 25 is not opened by the key lock switch 26, a write protect (WP) lump 81 in the front operation panel 80 in the detector signal processing circuit 8 or a write protect lump 121 in the operation panel 12 is lighted up, and it indicates the state in which data including the change of a set value can not be rewritten to the electrically rewritable nonvolatile memory 24. Further, by providing a write protect lump 251 in the signal processing card 11, the state of memory access limitation can be recognized more accurately.

Figure 4:
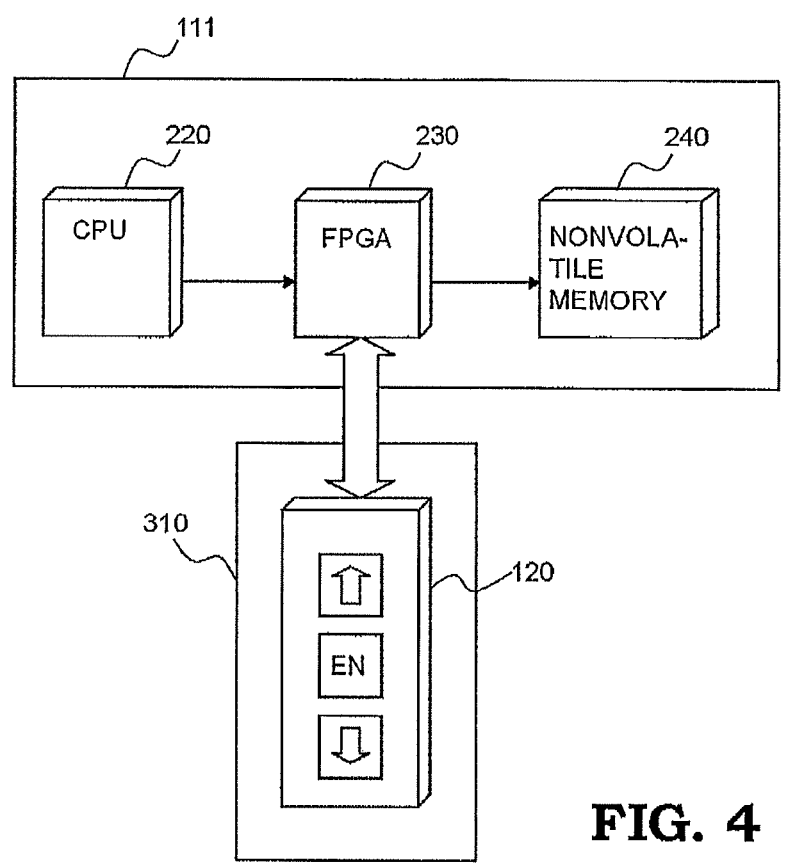
FIG. 4 is a block diagram showing one example of memory access configuration of a signal processing card of conventional ex-core nuclear instrumentation systems.

The configuration of the CPU 22, the first FPGA 231, the second FPGA 232 and the electrically rewritable nonvolatile memory 24 shown in FIG. 1 are different from those of CPU 220, FPGA 230, and the electrically rewritable nonvolatile memory 240 shown in FIG. 4, respectively. That is, as the state of the key hole 25 controls the write signal (WR) of the electrically rewritable nonvolatile memory 24 via the general-purpose logic 27, the state of write protect is the configuration which can be recognized by means of a circuit.

Operation will be described with reference to FIGS. 1, 2 and 3. The CPU 22 mainly performs control or arithmetic processing of signal processing so as to process a signal of the neutron detector 3 which is inputted from the detector signal processing circuit 8. On the other hand, output from the operation panel 12 is inputted to the second FPGA 232 by performing serial communication with the second FPGA 232 which is connected with the operation panel 12 with a serial communication line. As an example of inputting data from the operation panel 12, in a case where the sensitivity of the neutron detector 3 is changed, in order to correct the set value data, which is stored in the electrically rewritable nonvolatile memory 24, such as magnification of arithmetic, (correction coefficient), there is an operation for rewriting the set value data which is stored in the electrically rewritable nonvolatile memory 24 by inputting new set value data. The above-mentioned state, in which the data in the electrically rewritable nonvolatile memory 24 is required to rewrite, does not occur so often. Then, it is configured such that the operation of rewriting the data can be executed only after the key hole 25 is opened by the key lock switch 26.

In performing an operation other than the operation of rewriting the data which is stored in the electrically rewritable nonvolatile memory 24, there is a case in which an operator inputs the data from the operation panel 12. That is, a signal which is outputted from the operation panel 12 includes a signal other than a signal to the electrically rewritable nonvolatile memory 24.

For example, there is a following example. In FIG. 2, the detector signal processing circuit 8 includes a current/voltage conversion amplifier, and a card for test calibration 17 is provided so as to calibrate the current voltage conversion amplifier. In a case where a current voltage conversion amplifier is calibrated, a signal for calibrating is outputted from the card for test calibration 17 so as to calibrate the current voltage conversion amplifier. In a case where a test calibration is executed, the operation panel 12 is operated by an operator, and a command is transmitted from the operation panel 12 to the card for test calibration 17. In this time, operation for rewriting the data in the electrically rewritable nonvolatile memory 24 is not executed. However, in some cases, an operator may perform the operation for rewriting the data by mistake. In the configuration of FIG. 1, as long as the key hole 25 is not opened by the key lock switch 26, data in an electrically rewritable nonvolatile memory can not be rewritten.

As above-mentioned, only in the case of operation for rewriting the data which is stored in the electrically rewritable nonvolatile memory 24, after the key hole 25 is opened by an operator with the key lock switch 26, operation for rewriting the data is executed from the operation panel 12 or the front operation panel 80. When the key hole 25 is opened, the general-purpose logic 27 makes an access to the electrically rewritable nonvolatile memory 24 valid. Under the above-mentioned state, for example, when data is transmitted from the operation panel 12 to the second FPGA 232, the CPU 22 transmits a write signal to the electrically rewritable nonvolatile memory 24 via the first FPGA 231 and the general-purpose logic 27. Consequently, the data to be rewritten which is transmitted from the second FPGA 232 can be received by the electrically rewritable nonvolatile memory 24.

Further, the electrically rewritable nonvolatile memory 24 has a reset function. Upon starting up a power source, in an inner circuit in the electrically rewritable nonvolatile memory 24 and an external circuit thereof, a power source is started up by passing through a low voltage region in which the voltage is unstable. Therefore, it is configured such that, by providing a power supply monitoring circuit 28, an internal part of the electrically rewritable nonvolatile memory 24 is completely reset until a power supply starts normally so as to start up.

As above-mentioned, as the memory access is limited by physical access limitation of the key hole 25, only when the data in the electrically rewritable nonvolatile memory 24 is rewritten, the data is securely rewritten. In performing operation other than operation of rewriting data, access limitation to the electrically rewritable nonvolatile memory 24 is executed by the key hole 25. Consequently, the data in the electrically rewritable nonvolatile memory 24 can not be rewritten. For example, false writing in starting up of an electric power can be prevented. Further, in performing operation, other than rewriting the data in the electrically rewritable nonvolatile memory 24, which is executed by the operation panel 12 or the front operation panel 80, rewriting the data in the electrically rewritable nonvolatile memory 24 by mistake can be prevented.

Figure 3:
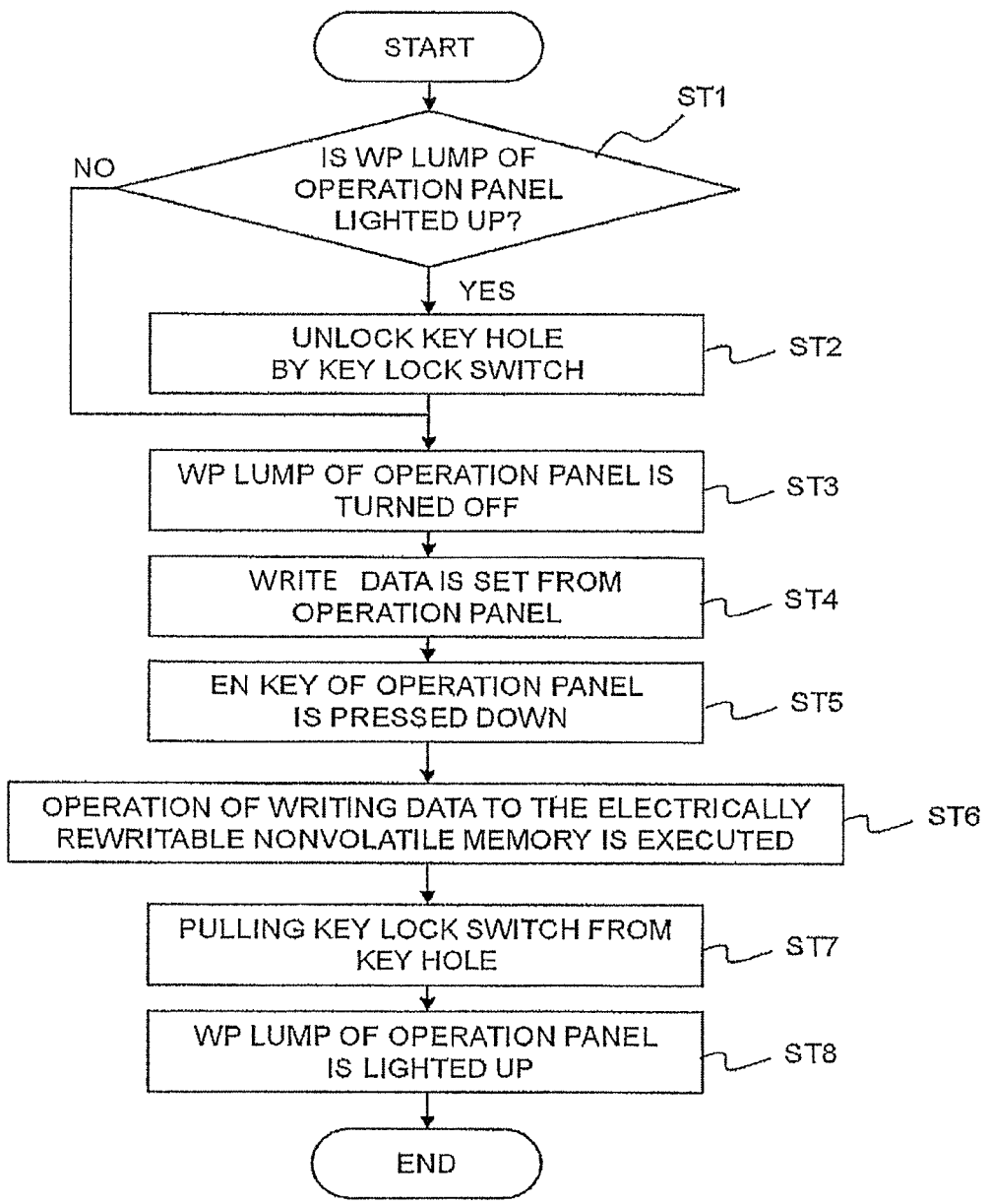
FIG. 3 is a flow chart for describing the operation of memory access according to Embodiment 1.

Operation of rewriting the data will be concretely explained by flow chart shown in FIG. 3. In the state where the key hole 25 is closed, rewriting the data in the electrically rewritable nonvolatile memory 24 is prohibited. Therefore, a WP (write protect) lump 121 of the operation panel 12 is lighted up so as to inform an operator of the above-mentioned state. When the operator intends to execute the operation of data rewriting, the operator is supposed to check whether the WP lump 121 of the operation panel 12 is lighted up or not (ST1). When the operator checks such that the WP lump 121 is lighted up, the key lock switch 26 is inserted into the keyhole 25 so as to unlock the keyhole 25 (ST2). When the key hole 25 is unlocked, the WP lump 121 of the operation panel 12 is turned off (ST3) so as to inform the operator of the state in which the lock is unlocked. In the step ST1, in a case where the WP lump 121 of the operation panel 12 is not lighted up, the lock of the key hole has been already unlocked; therefore, it is not necessary to perform the operation of unlocking the key by the key lock switch 26.

When it is checked such that the WP lump of the operation panel is turned off, write data is set from the operation panel (ST4). When it is checked such that the set value is correct, an EN(set) key of the operation panel is pressed down (ST5), set value data is inputted from the operation panel 12 to the second FPGA 232, and operation of writing data in the electrically rewritable nonvolatile memory 24 is executed (ST6). After the execution of operation of writing data is completed, by pulling the key lock switch 26 from the key hole 25, the key hole 25 is locked (ST7), the WP lump of the operation panel is lighted up (ST8), and it is informed to the operator such that data can not be rewritten.

As above-mentioned, the ex-core nuclear instrumentation system according to the present invention is configured such that in the state where the key lock switch 26 is inserted into the key hole 25, via the general-purpose logic 27, data can be rewritten in the electrically rewritable nonvolatile memory 24. In addition to that, the ex-core nuclear instrumentation system according to the present invention is configured such that when data can be rewritten in the electrically rewritable nonvolatile memory 24, the operation panel 12 and the second FPGA 232 perform serial communication, and in a case where the order of the data of the serial communication is a predetermined order of the data, the electrically rewritable nonvolatile memory 24 is controlled by the CPU 22. Consequently, it is configured such that rewriting data, which is outputted from the operation panel 12, to the electrically rewritable nonvolatile memory 24 is transmitted from the second FPGA 232 to the electrically rewritable nonvolatile memory 24 so as to rewrite the data in the electrically rewritable nonvolatile memory 24.

As above-mentioned, rewriting data to the electrically rewritable nonvolatile memory 24 from the operation panel 12 was explained. In rewriting data to the electrically rewritable nonvolatile memory 24 from the front operation panel 80, such as gain set which is set from the front operation panel 80 in the detector signal processing circuit 8, data is transferred via a serial communication line 84 between the front operation panel 80 and the first FPGA 231. In this time, as clear from the configuration of FIG. 1, in the same way as that of rewriting the data to the electrically rewritable nonvolatile memory 24 from the operation panel 12, access limit which is made by the key hole 25 and the key lock switch 26 is valid.

As above-mentioned, in the embodiment of the present invention, it is configured such that only when the key hole 25 is opened by the key lock switch 26, the data which is stored in the electrically rewritable nonvolatile memory 24 can be rewritten, and when the key hole 25 is not opened by the key lock switch 26, rewriting the data in the electrically rewritable nonvolatile memory 24 is not permitted. Further, reset function is added to the electrically rewritable nonvolatile memory 24, it is configured such that the reset function works in the unstable state when a power supply starts. Therefore, there is not any risk such that the data in the electrically rewritable nonvolatile memory 24 is rewritten by false operation of operator or when a power supply starts up.

What is claimed is:

1. An ex-core nuclear instrumentation system, comprising:
   neutron detectors which measure neutron flux leaked from a reactor vessel and convert the neutron flux into a current value,
   a detector signal processing circuit which converts the converted current value into a voltage value,
   a signal processing card which performs arithmetic processing using a voltage value which is converted in the detector signal processing circuit so as to input the state of neutron flux during the operation of the reactor,
   and an operation panel having a man machine interface,
   wherein the signal processing card includes a CPU, a FPGA, an electrically rewritable nonvolatile memory and a key switch,
   wherein the signal processing card has general-purpose logic, which is connected directly to the key switch and controls a write signal of the electrically rewritable nonvolatile memory, that is configured to prevent the writing to electrically nonvolatile memory when a key is removed from the key switch,
   and when the key is engaged with the key switch the CPU retrieves rewrite data from the operation panel through the FPGA to the electrically rewritable nonvolatile memory to rewrite the data in the electrically rewritable nonvolatile memory.

2. The ex-core nuclear instrumentation system as claimed in claim 1, wherein the signal processing card and the operation panel are constituted by separate electronic substrates, and the signal processing card and the operation panel are connected by a serial communication line.

3. The ex-core nuclear instrumentation system as claimed in claim 1, wherein signals which are outputted from the operation panel include signals other than rewriting data to the electrically rewritable nonvolatile memory.

4. The ex-core nuclear instrumentation system as claimed in claim 1, wherein the electrically rewritable nonvolatile memory is configured to be reset.

5. The ex-core nuclear instrumentation system as claimed in claim 1, wherein the man machine interface includes an input key.

* * * * *